(12) United States Patent
Lazarski et al.

(10) Patent No.: US 9,066,140 B2
(45) Date of Patent: Jun. 23, 2015

(54) TELEVISION USER INTERFACE

(75) Inventors: Wojciech Lazarski, Zielona Gora (PL); Marek Olejniczak, Poznan (PL); Paul Bristow, Geneva (CH)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 0 days.

(21) Appl. No.: 13/824,385

(22) PCT Filed: Dec. 23, 2011

(86) PCT No.: PCT/IB2011/003171
§ 371 (c)(1),
(2), (4) Date: Mar. 18, 2013

(87) PCT Pub. No.: WO2012/090060
PCT Pub. Date: Jul. 5, 2012

(65) Prior Publication Data
US 2013/0291016 A1    Oct. 31, 2013

(30) Foreign Application Priority Data

Dec. 29, 2010  (EP) ..................................... 10197239

(51) Int. Cl.
*H04N 7/173*       (2011.01)
*H04N 21/472*      (2011.01)
*H04N 5/44*        (2011.01)
(Continued)

(52) U.S. Cl.
CPC ........... *H04N 21/472* (2013.01); *H04N 5/4403* (2013.01); *H04N 5/445* (2013.01); *H04N 21/4126* (2013.01); *H04N 21/4312* (2013.01); *H04N 21/43637* (2013.01); *H04N 21/4722* (2013.01); *H04N 21/4786* (2013.01); *H04N 21/6125* (2013.01)

(58) Field of Classification Search
CPC .................................................. H04N 7/17318
USPC ..................................... 725/43, 133, 141, 153
See application file for complete search history.

(56) References Cited

U.S. PATENT DOCUMENTS 6,219,839 B1 * 4/2001 Sampsell ......................... 725/40
6,567,984 B1 * 5/2003 Allport ........................... 725/110

FOREIGN PATENT DOCUMENTS

WO          WO00/76217       *  6/2000  ............. H04N 7/173

*Primary Examiner* — Hunter B Lonsberry
(74) *Attorney, Agent, or Firm* — Mark M. Friedman

(57) ABSTRACT

It is disclosed a video system comprising a video unit (101) and an external device (106) operable by the same user of the video unit (101). The video unit (101) comprises a video receiver (114) for receiving video signals and a decoder (115) operatively connected to the video receiver (114) to decode the received video signals, a control unit (113) configured to generate an interactive interface to be displayed on a first screen and to display one of the received video signals on the first screen, a receiving unit (112) operatively connected to the control unit (113) to receive a selection of the user when the interactive interface is displayed, a data unit (114) operatively connected to said control unit (113) for transmitting data to the external device (106). The external device (106) comprises a connection unit for connecting to an external network (105) and a screen for displaying data retrieved from the external network. The control unit (113) triggers the external device (106) to run an application retrieving data from an external network (105), when said user selection is received. Data retrieved from the external network (105) are then displayed on a screen of the external device (106). A method for controlling the video system and a video unit for use in the video system is also disclosed.

14 Claims, 5 Drawing Sheets

(51) Int. Cl.
*H04N 5/445* (2011.01)
*H04N 21/41* (2011.01)
*H04N 21/431* (2011.01)
*H04N 21/4363* (2011.01)
*H04N 21/4722* (2011.01)
*H04N 21/61* (2011.01)
*H04N 21/4786* (2011.01)

TELEVISION USER INTERFACE

TECHNICAL FIELD

The present invention relates to video systems, and in particular to interactive video systems which allow a user to connect to a remote computer network for retrieving data contents to be displayed to a user of a video system. In particular, the invention relates to a video system according to the preamble of claim 1.

BACKGROUND ART

Nowadays video contents are provided to the user via a huge amount of video sources. Cable, satellite and broadcast TV provides for TV programs via different TV channels. Optical and magnetic supports (like CD, DVD, Blu-RAY Disc and tapes), as well as mass memories (like hard discs and USB keys) allows storing movies that can be reproduces by a reading device. The Internet is also a huge source of video information: a user can easily download movies or view TV programs that are transmitted in streaming by a web server.

Different devices can therefore be used to watch different video contents: ordinary set-top-boxes and TV sets are used to watch broadcast or cable TV signals, while personal computers, palm or smart phones are used to watch video provided via IP.

In this scenario, new apparatuses have been developed which can be used both as a computer for navigating the Internet and as a TV set for watching video content.

As an example, US patent application US2001/0034883 discloses systems and methods for displaying Internet contents associated with television programming. In one embodiment the system comprises a set-top-box connected to an ordinary TV set and controlled via an ordinary remote control. The set-top-box includes hardware and/or software for providing the user with a graphical user interface, by which the user can access various Internet system network services, browse the Web, send e-mail, and otherwise access the Internet. The set-top-box is configured so as to display concurrently web contents and television programming.

This system has the drawback that displaying of web contents concurrently with TV programs requires a huge processing capacity of the set-top-box and is not always optimal. In particular, motion of the video content can annoy the user who's looking at a web page or at a text.

U.S. Pat. No. 7,181,756 by the same inventor, discloses that by using the remote control the user can decide to watch either the TV program or the web page associated to the TV program. In this case watching of one content exclude watching of the other.

In both solutions disclosed by US2001/0034883 and U.S. Pat. No. 7,181,756, a further problem arises: while TV set are of big dimensions in order to be watched at great distance (typically from 1.5 m to 3 m), Internet contents are often thought for a user that seats at few tens of centimeters from the screen; in this cases displaying is not always good.

Additionally, the STBs disclosed by US2001/0034883 and U.S. Pat. No. 7,181,756 requires a web browser or a mail client to be loaded on the STB, therefore manufacturing costs of these apparatuses increases while performance and reliability can be affected by the presence of different independent software applications.

In the same field of video systems, US 2002/0154888 discloses a remote control for a digital video recorder (DVR) including an integrated display screen configured to display a list of programs. The list may be an EPG, a list of programs to be recorded, or a list of recorded programs. A user can navigate through the list to select a television program, as well as various digital recording playback operations to be performed for the selected television program. In this solution, the list of programs is received by the STB together with TV programs transmitted by a broadcast center. This solution is proposed to allow a user of a DVR to operate it without interfering with or obscuring the television program being currently displayed.

The remote control known from US 2002/0154888 is not used to display video contents, but just a list of characters corresponding to an EPG or a list of programs. In particular, this solution is not thought for displaying Internet video contents.

There's therefore the need for a video system which allows displaying Internet contents in a more efficient way.

DISCLOSURE OF THE INVENTION

In one aspect, the present invention is directed to a video system, and in particular to an interactive video system, which overcomes one, some or all of the drawbacks of prior-art devices and/or systems and/or methods for displaying video and graphics retrieved from different sources.

The present invention, in one or more embodiments, may provide a video system comprising a video unit (e.g. a set-top-box) that displays control options of an interactive interface to the user. When a user selects a control option that requires data from an external network, like downloading of e-mails, the video unit connects to an external device and triggers it to run an application retrieving data from the external network. Data retrieved from the external network are then displayed on a screen of the external device (106).

This solution provides the advantage that a user of a video system can request data from an external network by operating the user interface that is ordinarily used for control of the video system. Data are then retrieved by an external device which is provided with all the means (hardware and software) necessary to retrieve and display this data. In this way, the video unit does not need to run software applications that can interfere with the correct working of the video unit, i.e. displaying video contents. Moreover, computational capacity, and cost of the video unit can be reduces since certain jobs are delegated to the external device.

Finally, this solution has the advantage that displaying of the contents retrieved from the internet are always well displayed since there's no more the problem of resizing characters of the big screen of a TV set.

In one aspect, the invention is also directed to a video unit (101) for use in the above mentioned video system. The video unit comprises a video receiver (e.g. a tuner) for receiving video signals and a decoder operatively connected to the video receiver to decode the received video signals, a control unit configured to generate an interactive interface to be displayed on a first screen and to display one of the received video signals on said first screen, a receiving unit operatively connected to said control unit to receive a selection of the user when said interactive interface is displayed, a data unit operatively connected to said control unit for transmitting data to an external device. The control unit is adapted to operate the data unit so as to transmit a trigger signal for the external device to run an application retrieving data from an external network, when the user selection is received, and to display on a second screen of the external device data retrieved from the external network.

According to another aspect, the invention is directed to a device for use in the above mentioned video system. This device, preferably a mobile phone, comprises a first connection unit for connecting to an external network, a second connection unit for connecting to a video unit of the video system, a screen for displaying data retrieved from the external network, and a control unit operatively connected to said first and second connection units and to said screen. The control unit is adapted to receive a trigger signal from the video unit via the second connection unit, and to run an application retrieving data from an external network when the trigger signal is received. Control unit then causes data retrieved from the external network to be displayed on the screen.

Notwithstanding the invention is described and illustrated herein with reference to a limited number of embodiments, it is understood that various combinations of the elements, decoders, units, computers, computer server, circuital and logic blocks, other than those specifically illustrated, are contemplated and are within the scope of the present invention which is defined by the attached claims forming integral part of the present description.

BRIEF DESCRIPTION OF DRAWINGS

The invention will be presented here below with reference to non limiting examples, provided for explicative and non limitative reasons in the annexed drawings. These drawings illustrate different aspects and embodiments of the present invention and, where appropriate, reference numerals illustrating like structures, components, materials and/or elements in different figures are indicated by similar reference numbers.

BEST MODE FOR CARRYING OUT THE INVENTION

Figure 1:
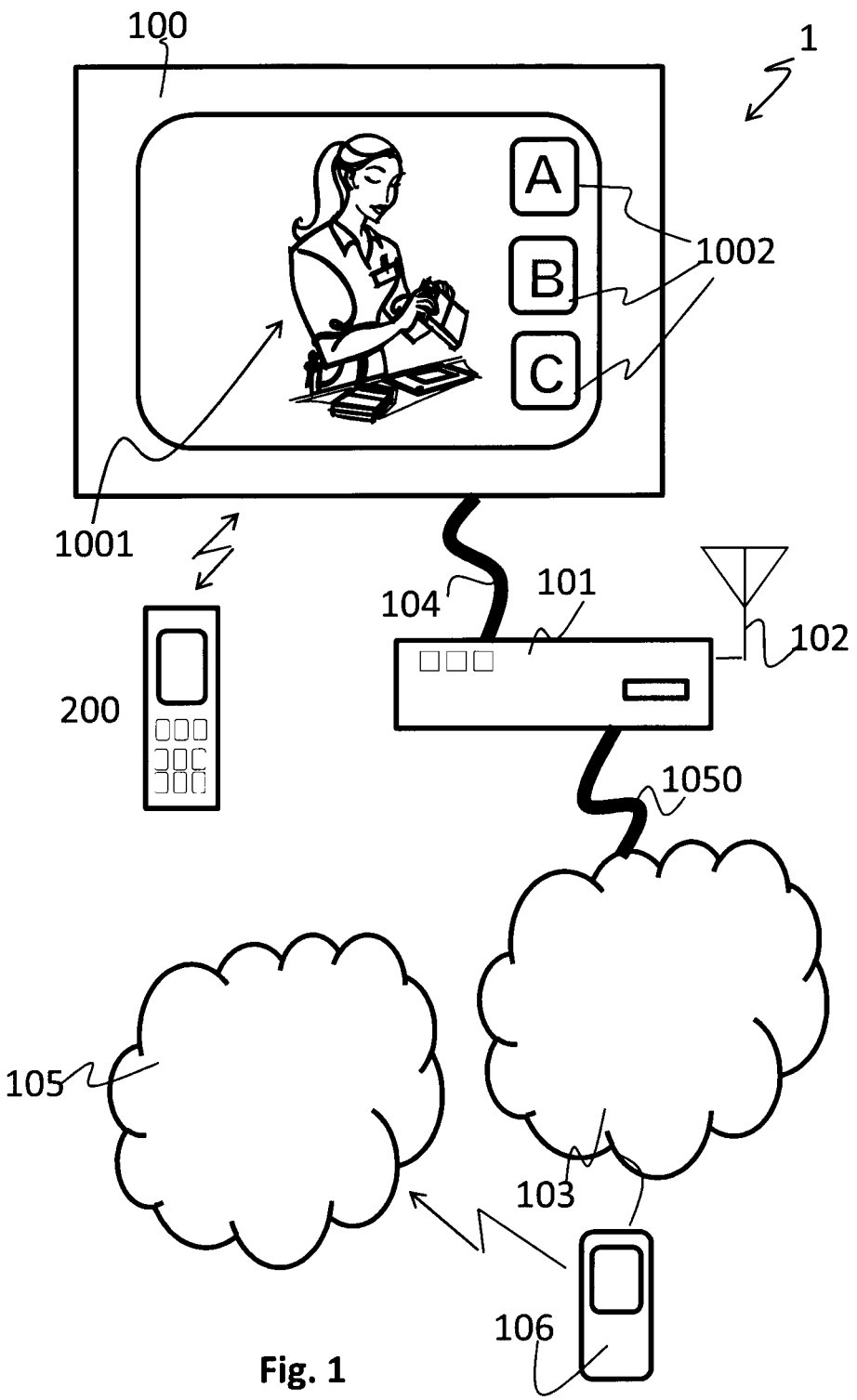
FIG. 1 illustrates a video system according to a first exemplary embodiment of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

In the following description the term "to run an application" is intended in a broad sense to comprise both cases in which an application that was not running is then caused to run, and the case in which an application that is already running, is caused to run with particular inputs, i.e. to change the way it is running.

In FIG. 1, disclosed is a video system 1 that allows a user to view video contents.

Video system 1 comprises a TV set 100 adapted to receive and display analogue and digital, in particular DVB (Digital Video Broadcast), TV signals and a video unit for receiving and processing broadcast television channels, in particular cable or satellite or terrestrial TV channels.

In the following non limitative examples the video unit is a set-top-box 101 connected via a video link to the TV set 100; the video link can be an RF (Radio frequency) video link, an S-Video, Composite Video, or other form of video link.

Set-top-box 101 receives broadcast TV signals, decodes them and provides output video signals to the TV set 100 over the above mentioned video link; in this way a user can watch on TV set 100 TV programs transmitted by the satellite or cable operators and received by set-top-box 101. In order to implement the above actions, in the embodiment of FIGS. 1 and 2 set top box 101 comprises a video receiver 114 (in particular a tuner) connected to an antenna 102 which receives terrestrial signals. In case the set-top-box is configured to receive cable signals, tuner 114 will be connected to the cable via a dedicated connector.

Tuner 114 is controlled by microcontroller 113 in order to tune on the desired TV channel, which is output to a decoder 115 that decodes it and provides it to the display controller 116 which provides video output signals over the video link connecting set-top-box 101 and TV set 100.

In alternative embodiments of the present invention, TV set 100 can be replaced by any device suitable to display video signals received by set-top-box 101, e.g. a video projector or a computer monitor.

Microcontroller 113 controls tuner 114 according to user commands received via an infrared receiver 112 in wireless communication with a remote control 200 operated by the user of video system 1.

In order to improve easiness of use of the video system, set-top-box 101 is provided with an interactive user interface (UI). A memory area, in particular a ROM 117, stores code portions that, once run by microcontroller 113, implement the interactive user interface (UI) which allows human-machine interaction between user and STB 101 or the video system 1 in general.

In order to allow the user to select between different control options for controlling video system 1 while watching a TV program, in a per se known way microcontroller 113 controls graphic controller 118 in order to generate text and graphics to be provided to the display controller 116.

Display controller 116 mixes graphics output from graphic controller 118 with the video output from video decoder 115. The signal generated by display controller 116 is than provided to the TV set via video link 104. TV set 100 therefore will display the TV program 1001 and several graphics 1002.

Control options can be displayed via several menus and banners of the UI that can be navigated by the user via remote control 200.

In one aspect of the invention, one or more of the control options that are displayed to the users, require retrieval of data from an external network 105 like the Internet, which (as it is well known) is a network of computer networks. As an example, one option can be checking of new e-mails on a users e-mail address, or retrieval of information from a web server, like weather forecast or TV program information.

By means of the code portions stored in memory area 117, microcontroller 113 is configured to implement the method for controlling video systems described in the following with reference to the block diagram of FIG. 3. The code portions may also be stored on other recording media than the memory area 117, such as hard disk drive frequently present in STBs nowadays. The code portions, in another embodiment, may be suitable to be executed on any computer comprising components as required by the method steps.

The method starts at step 300, when the user operates the video system 1 and activates a menu of the UI wherein at least one control option requires retrieval of information from the Internet.

At step 301 the user select one control option that requires retrieval of data from the Internet. Example of control options requiring retrieval of data from the Internet are: control option for downloading e-mails, control option for connecting to a web page, control option for displaying weather forecast, control option for connecting to Facebook® or other social network, and so on. Selection can be operated by means of keys and buttons of remote control 200.

At step 302, microcontroller connects to a local network 103 and requests an external device 106 (e.g. a PC, a smart phone, a tablet PC or similar devices) to run a software application associated to the control option selected by the user. As an example, if the user requests to check his/her e-mails, than microcontroller 113 receives the selection of the user via remote controller 200 and generates a request to download e-mails to an external device provided with a mail client software (e.g. Outlook®).

Figure 2:
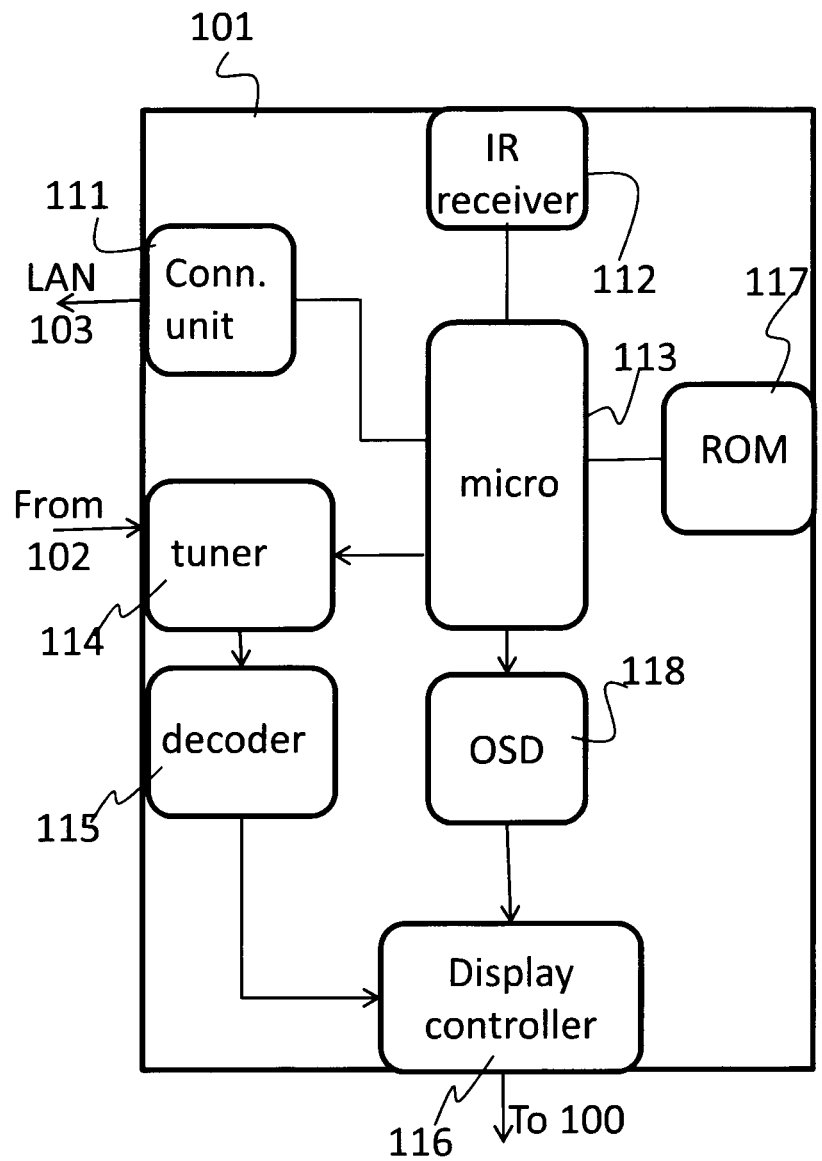
FIG. 2 illustrates a block scheme of a video unit of the video system of FIG. 1.

In the embodiment disclosed with reference to FIGS. 1 and 2, in order to establish connection with the external device 106 set-top-box (STB) 101 comprises a data unit 111 for connection to the local area network 103, in particular a Wi-Fi network based on IEEE 802.11 standards. In an alternative embodiment, data unit 111 can be configured to communicate via Bluetooth, Radio Frequency, e.g.

In one preferred embodiment, STB 101 is adapted to receive IPTV via data unit 111. In this preferred embodiment, STB is adapted to connect to a service provider providing IPTV. Connection with the service provider is obtained without need of a web browser adapted to display web pages, therefore the STB can be adapted to receive IPTV without need of software application that could affect performance and reliability of the STB. In this embodiment, IPTV data packets received via data unit 111 are then provided to a decoder that decodes them and provides them to the display controller 116.

The invention is not limited to particular standards and protocols. In order to implement the invention, STB shall be able to communicate with an external device that can be operated by the same user of the STB. In an alternative embodiment, connection with the external device can be a direct connection without need to have STB and external device to connect via a LAN network.

As STB 101 is able to communicate with the external device via a Wi-Fi connection, in an embodiment alternative to that of FIG. 1, remote controller 200 communicates with the set-top-box via the Wi-Fi connection provided by data unit 111; in this embodiment IR receiver 112 is therefore not necessary and remote control 200 can be a smart phone or a palm provided with an application for controlling the set-top-box. In this embodiment, external device 106 and remote control 200 can be the same device.

Figure 3:
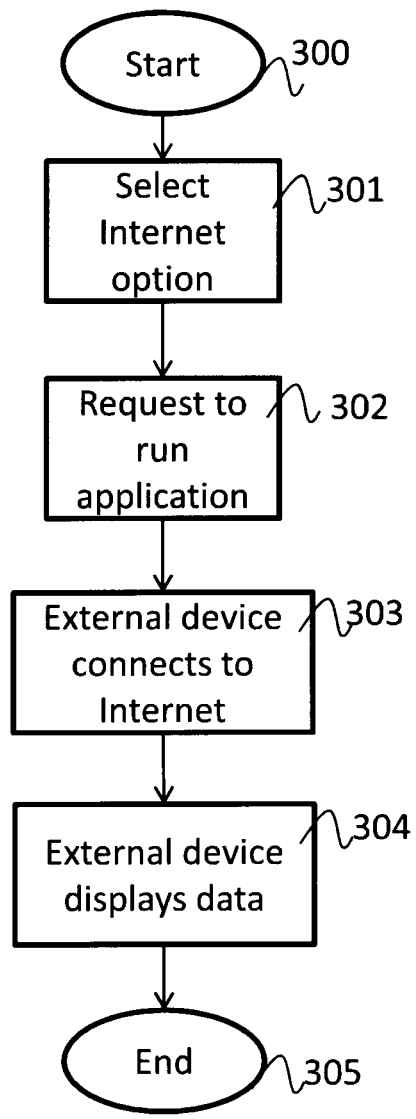
FIG. 3 illustrates a flow diagram of a method for controlling the video system of FIG. 1.

Coming back to the method of FIG. 3, the external device receives a request to run a software application indicated in a message transmitted from microcontroller 113 via data unit 111. In the preferred embodiment, the message transmitted by microcontroller 113 comprises a full query indicating which software application has to be run and with which input parameters. E.g. microcontroller can request to start a web browser to connect to a particular URL. In one embodiment, the message transmitted from microcontroller does not explicitly indicates which software application has to be run, the application to be run is selected by the external device based on the content of the message received. As an example, if the message contains an URL, the external device will select a default web browser to connect to the URL.

While the video is displayed, external device 106 runs the requested application and connects (step 303) to a remote computer of the Internet, e.g. a mailbox server or a web server, to retrieve data requested by the user via the set-top-box UI.

In one embodiment, data requested by the user are displayed (step 304) on the external device 106 running the requested application and the method ends (block 305). As an example, if the user requests to download his/her e-mails, the latters are displayed on the screen of the external device 106.

Figure 4:
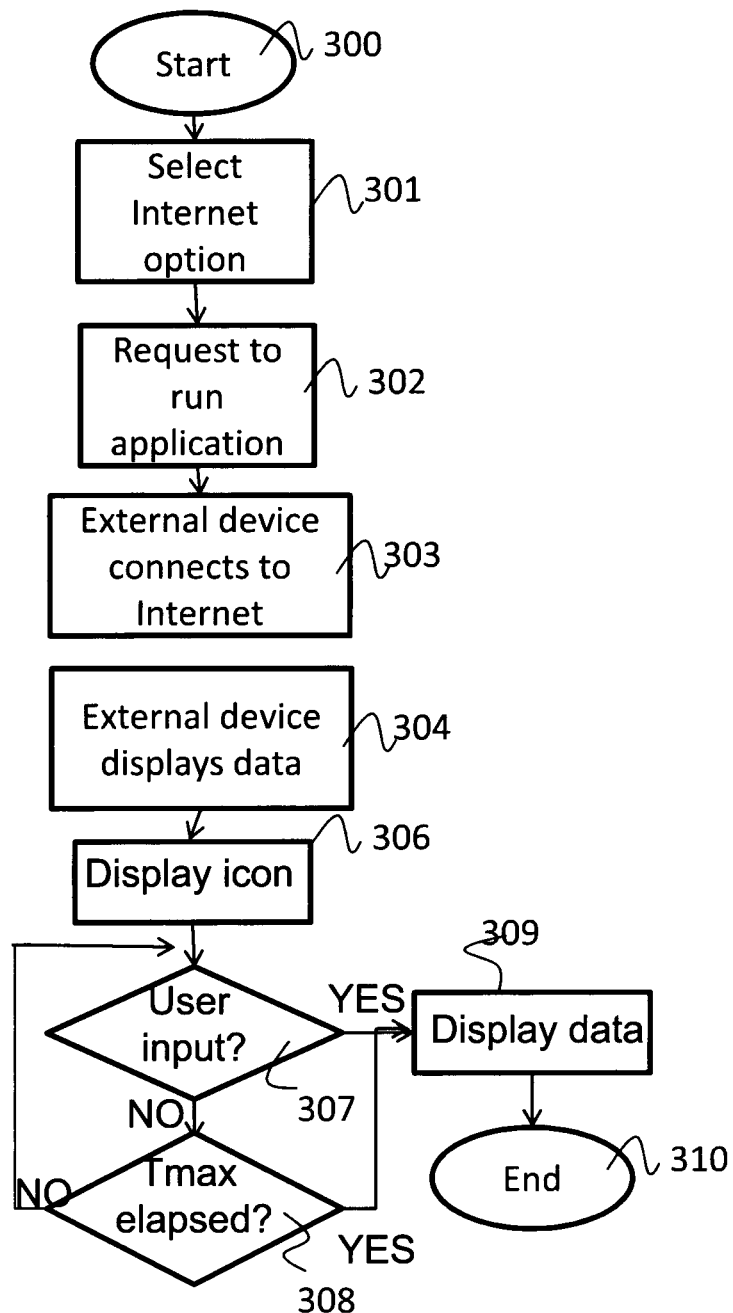
FIG. 4 illustrates a flow diagram of a method for controlling the video system of FIG. 1 according to a second embodiment.

In an alternative embodiment shown in FIG. 4, data are not immediately displayed and the external device and the method provides for displaying (306) on the screen of the TV set 100, an alert icon indicating that data downloaded by the software application is available for displaying. The external device 106 therefore transmits a signal indicating that data retrieved are available for displaying.

Microcontroller 113 receives a signal that data have been retrieved via data unit 111, and controls display controller 116 to display an alert icon.

Figure 5:
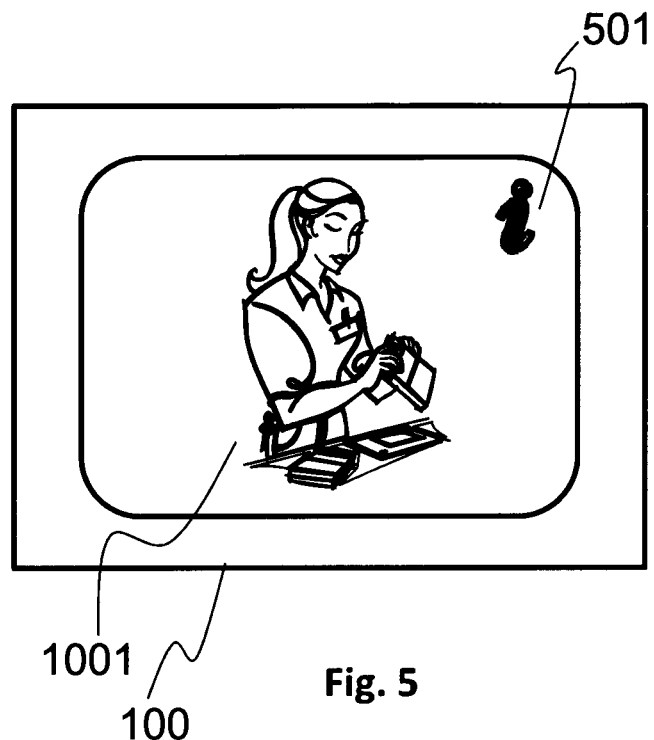
FIG. 5 illustrates the video system of FIG. 1, wherein an alert icon is displayed.

FIG. 5 shows an example of icon 501 displayed on the screen of the TV set 100 while the user is watching the video.

When icon 501 is displayed, the user can watch data retrieved by the software application by pressing a button on the remote control 200.

The method therefore provides for a waiting loop wherein the set-top-box waits (for a maximum time Tmax) for user commands to watch data retrieved from the external network. This waiting loop is disclosed in FIG. 4 by means of blocks 307 and 308. At step 307, the set-top-box checks if a user command has been received, if not, the method goes to step 308, wherein it is checked whether the maximum time Tmax has elapsed from displaying of icon 501. If this time has not elapsed, the method returns to step 307 to check if a user command has been received.

In case T max has elapsed or in case at step 307 a command from the user is received, than the method provides for displaying (step 309) the data retrieved from the external network on the display of a second device 106.

Set-top-box 101 therefore transmits a command triggering the external device to the display data retrieved from the external network 105.

The method then ends, block 310.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the claimed invention will become readily apparent to those skilled in this art from the above detailed description describing preferred embodiments of the invention, simply by way of illustration of the best mode contemplated by carrying out the invention. As it can readily be realized, the invention is capable of modification in various obvious respects all without departing from the invention. Accordingly, the drawings and description of the preferred embodiments are to be regarded as illustrative in nature, and not as restrictive in nature and various changes may be made without departing from the scope of the invention as defined by the following claims.

As an example, data can be retrieved from the external network automatically based on settings stored in a memory area of the set-top-box. When set-top-box 101 is switched on, it searches for external devices provided with a predetermined software application that can be retrieve data from the Internet. If such a device is found, STB requests it to run the software application and retrieve data of interest of the user.

Moreover, it is clear that the invention is not limited to the video system and to the method for controlling the video system, but is directed to any of the devices of the video system.

Figure 6:
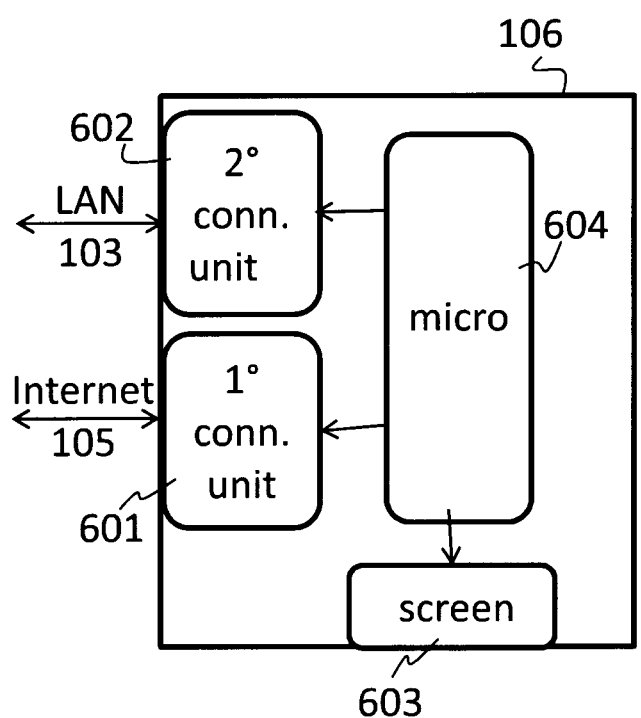
FIG. 6 illustrates a block scheme of a device of the video system of FIG. 1.

In particular, the invention is also intended to cover a device (e.g. a mobile phone or smart phone or PC) for use in the video system 1 above described with reference to FIGS. 1 to 5. As disclosed with reference to FIG. 6, this device comprises a first connection unit 601 for connecting to an external network (e.g. network 105 of FIG. 1), a second connection unit 602 for connecting to a video unit (e.g. set-top-box 101) of the video system 1, a screen 603 for displaying data retrieved from the external network, and a control unit 604 operatively connected to said first and second connection units and to said screen.

The control unit is adapted to receive a trigger signal from the video unit via the second connection unit 602, and to run an application retrieving data from an external network (105), when said trigger signal is received. Control unit 604 is also adapted to control said screen 604 to display said screen 603 data retrieved from the external network.

In a preferred embodiment, control unit 604 is adapted to transmit, via said second connection unit 602, a signal that data are available for displaying. Control unit 604 then waits for a second trigger signal triggering the external device 106 to display the retrieved data on the screen 603 as above described with reference to FIG. 4.

The invention claimed is:

1. A video system comprising a video unit (101) and an external device (106) operable by the same user of the video unit (101), the video unit (101) comprising
   a receiver (114) for receiving video signals from a video source,
   a decoder (115) operatively connected to the receiver (114) to decode the received video signals,
   a control unit (113) configured to generate an interactive interface to be displayed on a first screen and to display one of the received video signals on said first screen,
   a receiving unit (112) operatively connected to said control unit (113) to receive a selection of the user when said interactive interface is displayed,
   a data unit (111) operatively connected to said control unit (113) for transmitting data to said external device (106), the external device (106) comprising a connection unit for connecting to an external network (105) and
   a screen for displaying data retrieved from the external network,
characterized in that
   said control unit (113) is adapted to:
      trigger the external device (106) to run an application retrieving data from an external network (105), when said user selection is received,
      triggering, after elapse of a maximum time (Tmax), display on a second screen of the external device (106) data retrieved from the external network (105), the external network (105) being other than the video source.

2. The video system of claim 1, wherein said control unit (113) is adapted to trigger display of the retrieved data on the external device (106) after the user has provided a command to the video unit in response to display of an icon (501) on said first screen.

3. The video system of claim 1, wherein only the external device is adapted to run said application retrieving data associated to control the option selected by the user.

4. The video system of claim 1, wherein said external device is a mobile phone.

5. A method for displaying video and data contents in a video system, comprising the steps of
   displaying a video content from a video source, in particular a TV program, on a first screen,
   displaying on said first screen an interactive interface allowing a user of the video system to select a control option, and
   receiving at a video unit a signal relating to a control option selected by the user,
   the method being characterized by:
   the video unit triggering an external device (106) to run an application retrieving data from an external network (105), when said control option is selected, and
   the video unit triggering, after elapse of a maximum time (Tmax), the external device (106) to display on a screen of the external device (106) data retrieved from the external network (105),
   the external network (105) being other than the video source.

6. The method of claim 5, wherein said wherein said video unit (113) triggers display of the retrieved data on the external device (106) after the user has provided a command to the video unit in response to display of an icon (501) on said first screen.

7. The method of claim 5, wherein only the external device is adapted to run said application retrieving data associated to control the option selected by the user.

8. The method of claim 5, wherein said external device is a mobile phone that connects to a mobile phone network to retrieve said data.

9. A video unit (101) for use in a video system according to claim 1, comprising:
   a video receiver (114) for receiving video signals from a video source,
   a decoder (115) operatively connected to the video receiver (114) to decode the received video signals,
   a control unit (113) configured to generate an interactive interface to be displayed on a first screen and to display one of the received video signals on said first screen,
   a receiving unit (112) operatively connected to said control unit (113) to receive a selection of the user when said interactive interface is displayed, and
   a data unit operatively connected to said control unit (113) for transmitting data to an external device (106),
characterized in that
   said control unit (113) is adapted to
      operate said data unit so as to transmit a trigger signal for the external device (106) to run an application retrieving data from an external network (105), when said user selection is received, and to display, after elapse of a maximum time (Tmax), on a second screen of the external device (106) data retrieved from the external network (105), the external network (105) being other than the video source.

10. The video unit of claim 9, wherein said wherein said control unit (113) is adapted to:

operate said data unit (111) so as to transmit a first trigger signal to trigger the external device to run said application, and to transmit a second trigger signal, receive a signal that data have been retrieved via said data unit, control a display controller (116) to display an icon on said first screen, operate said data unit (111) so as to transmit a second trigger signal triggering the external device (106) to display the retrieved data on the external device (106) after the user has provided a command to the video unit in response to display of an icon (501) on said first screen.

11. The video unit of claim 8, wherein said data unit is a Wi-Fi transceiver.

12. A device for use in the video system (1) according to claim 1, comprising:

a first connection unit (601) for connecting to an external network (105), a second connection unit (602) for connecting to a video unit (101) of said video system (1), said video system adapted to receive video signals from a video source, a screen (603) for displaying data retrieved from the external network, and a control unit (604) operatively connected to said first and second connection units and to said screen, characterized in that said control unit (604) is adapted to receive a trigger signal from said video unit (101) via said second connection unit (602), to run an application retrieving data from an external network (105) when said trigger signal is received, and to display, after elapse of a maximum time (Tmax), said screen data retrieved from the external network (105), the external network (105) being other than the video source.

13. The device of claim 10, wherein said control unit is adapted to transmit, via said second connection unit (602), a signal that data are available for displaying and to wait for a second trigger signal triggering the external device (106) to display the retrieved data on said screen.

14. A non-transitory computer readable medium storing computer-executable instructions performing all the steps of the method according to claim 5 when executed on a computer.

* * * * *

UNITED STATES PATENT AND TRADEMARK OFFICE
CERTIFICATE OF CORRECTION

PATENT NO. : 9,066,140 B2
APPLICATION NO. : 13/824385
DATED : June 23, 2015
INVENTOR(S) : Wojciech Lazarski et al.

It is certified that error appears in the above-identified patent and that said Letters Patent is hereby corrected as shown below:

In the claims:

Column 8, Line 62, Claim 9 should be corrected as follows:
Change
-- a data unit operatively connected to --
to
"a data unit (111) operatively connected to"

Signed and Sealed this
Third Day of November, 2015

Michelle K. Lee
*Director of the United States Patent and Trademark Office*